(12) United States Patent
Lee (10) Patent No.: US 6,967,799 B1
(45) Date of Patent: Nov. 22, 2005

(54) SERVO WRITING A DISK DRIVE FROM SPIRAL TRACKS BY GENERATING A TIME-STAMPED SYNC MARK DETECT SIGNAL PROCESSED BY TIMING RECOVERY FIRMWARE

(75) Inventor: Tehri S. Lee, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/857,468

(22) Filed: May 28, 2004

(51) Int. Cl.[7] .............................................. G11B 5/09
(52) U.S. Cl. ........................................ 360/51; 360/39
(58) Field of Search ............................. 360/28, 29, 30, 360/39, 51

(56) References Cited

U.S. PATENT DOCUMENTS

| | | | |
|---|---|---|---|
| 5,576,906 A | 11/1996 | Fisher et al. | |
| 5,583,712 A * | 12/1996 | Brunelle | ................... 360/77.07 |
| 5,668,679 A | 9/1997 | Swearingen et al. | |
| 5,696,639 A * | 12/1997 | Spurbeck et al. | ............. 360/51 |
| 5,754,352 A | 5/1998 | Behrens et al. | |
| 6,069,499 A | 5/2000 | Cho et al. | |
| 6,091,564 A * | 7/2000 | Codilian et al. | ............... 360/75 |
| 6,111,710 A * | 8/2000 | Feyh et al. | .................... 360/46 |
| 6,191,906 B1 | 2/2001 | Buch | |
| 6,249,395 B1 | 6/2001 | Conway | |
| 6,292,318 B1 * | 9/2001 | Hayashi | ....................... 360/48 |
| 6,304,407 B1 | 10/2001 | Baker et al. | |
| 6,366,225 B1 | 4/2002 | Ozdemir | |
| 6,411,453 B1 | 6/2002 | Chainer et al. | |
| 6,429,989 B1 | 8/2002 | Schultz et al. | |
| 6,507,450 B1 | 1/2003 | Elliott | |
| 6,519,107 B1 | 2/2003 | Ehrlich et al. | |
| 6,587,293 B1 | 7/2003 | Ding et al. | |
| 6,704,156 B1 | 3/2004 | Baker et al. | |
| 6,738,205 B1 * | 5/2004 | Moran et al. | .................. 360/17 |
| 2004/0003193 A1 * | 1/2004 | Chainer et al. | ............. 711/167 |

OTHER PUBLICATIONS

U.S. Appl. No. 09/993,778 entitled "Servo Circuit Having a Synchronous Servo Channel and Method for Synchronously Recovering Servo Data".

* cited by examiner

Primary Examiner—David Hudspeth
Assistant Examiner—Dismery Mercedes
(74) Attorney, Agent, or Firm—Howard H. Sheerin, Esq.

(57) ABSTRACT

A disk drive is disclosed servo written from spiral tracks by generating a time-stamped sync mark detect signal processed by timing recovery firmware. A plurality of spiral tracks are written to the disk, wherein each spiral track comprises a high frequency signal interrupted at a predetermined interval by a sync mark. The head internal to the disk drive is used to read the spiral tracks, and a time-stamped sync mark detect signal is generated when one of the sync marks is detected. The time-stamped sync mark detect signal represents a time when the sync mark was detected relative to a servo write clock. A difference between the time-stamped sync mark detect signal and an expected time is computed in firmware to generate a coarse timing recovery measurement used to synchronize the servo write clock. The servo write clock and the head internal to the disk drive are used to write product servo sectors along a substantially circular target path.

8 Claims, 13 Drawing Sheets

SERVO WRITING A DISK DRIVE FROM SPIRAL TRACKS BY GENERATING A TIME-STAMPED SYNC MARK DETECT SIGNAL PROCESSED BY TIMING RECOVERY FIRMWARE

CROSS REFERENCE TO RELATED APPLICATIONS AND PATENTS

This application is related to other co-pending U.S. patent applications including Ser. No. 10/769,387 entitled "USING AN EXTERNAL SPIRAL SERVO WRITER TO WRITE REFERENCE SERVO SECTORS AND SPIRAL TRACKS TO A DISK TO FACILITATE WRITING PRODUCT SERVO SECTORS TO THE DISK" filed on Jan. 30, 2004, Ser. No. 10/769,680 entitled "SERVO WRITING A DISK DRIVE BY SYNCHRONIZING A SERVO WRITE CLOCK TO A HIGH FREQUENCY SIGNAL IN A SPIRAL TRACK" filed on Jan. 30, 2004, and Ser. No. 10/769,386 entitled "SERVO WRITING A DISK DRIVE BY SYNCHRONIZING A SERVO WRITE CLOCK IN RESPONSE TO A SYNC MARK RELIABILITY METRIC" filed on Jan. 31, 2004, the disclosures of which are incorporated herein by reference.

BACKGROUND OF THE INVENTION

1. Field of the Invention

The present invention relates to disk drives for computer systems. More particularly, the present invention relates to servo writing a disk drive from spiral tracks by generating a time-stamped sync mark detect signal processed by timing recovery firmware.

2. Description of the Prior Art

Figure 1:
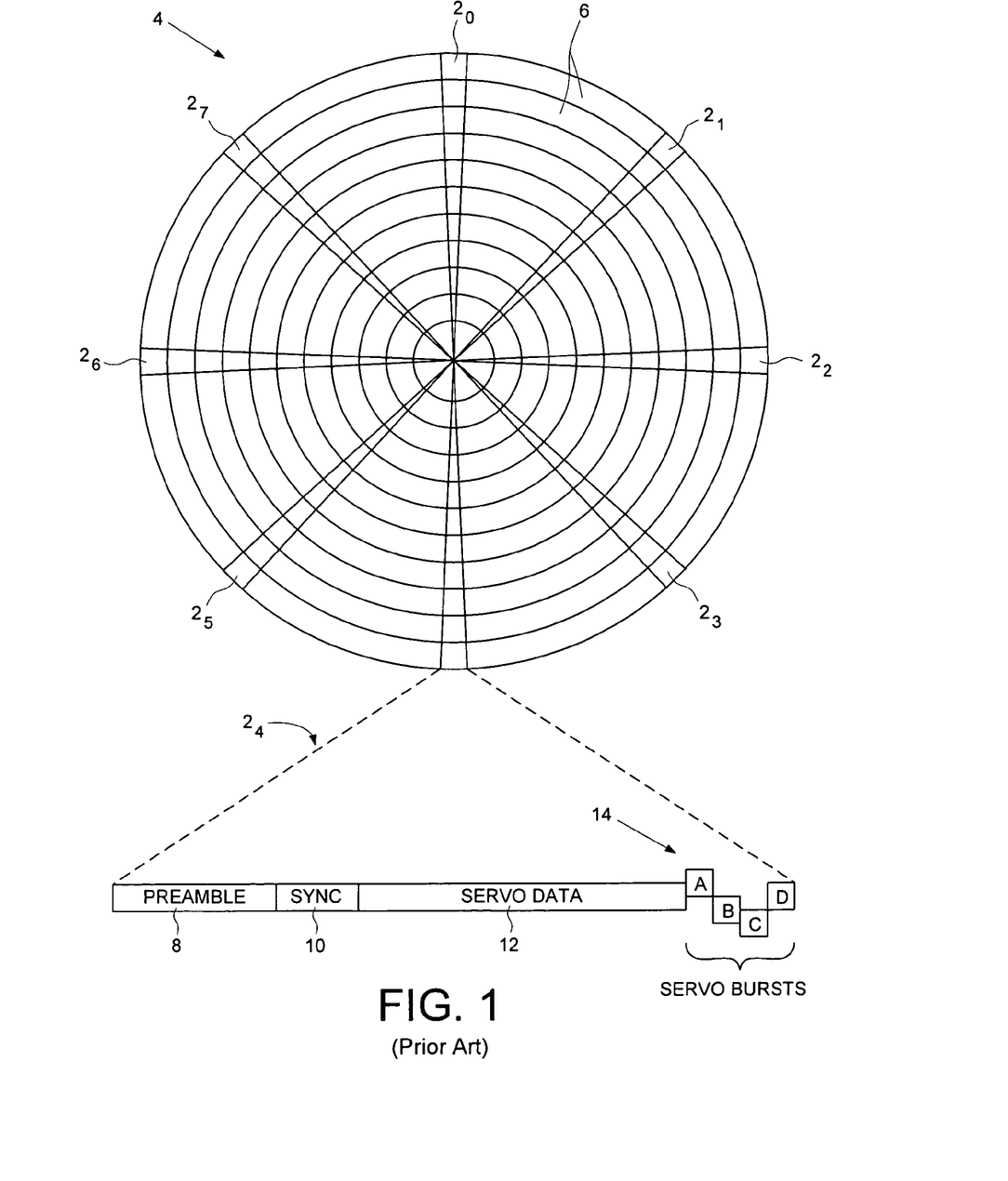
FIG. 1 shows a prior art disk format comprising a plurality of radially spaced, concentric tracks defined by a plurality of product servo sectors.

When manufacturing a disk drive, product servo sectors $2_0$–$2_7$ are written to a disk 4 which define a plurality of radially-spaced, concentric data tracks 6 as shown in the prior art disk format of FIG. 1. Each product servo sector (e.g., servo sector 24) comprises a preamble 8 for synchronizing gain control and timing recovery, a sync mark 10 for synchronizing to a data field 12 comprising coarse head positioning information such as a track number, and servo bursts 14 which provide fine head positioning information. During normal operation the servo bursts 14 are processed by the disk drive in order to maintain a head over a centerline of a target track while writing or reading data. In the past, external servo writers have been used to write the product servo sectors $2_0$–$2_7$ to the disk surface during manufacturing. External servo writers employ extremely accurate head positioning mechanics, such as a laser interferometer, to ensure the product servo sectors $2_0$–$2_7$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. In addition, the '679 patent generates a servo write clock by synchronizing a phase-locked loop (PLL) to the missing bits in the spiral tracks. However, in the '679 patent the timing recovery measurement for updating the PLL is generated in hardware using complex and expensive timing circuitry for measuring the phase difference between the detected missing bits and the servo write clock.

There is, therefore, a need for a simple, less expensive technique for synchronizing a servo write clock when servo writing a disk drive by servoing on spiral tracks.

SUMMARY OF THE INVENTION

The present invention may be regarded as a method of writing product servo sectors to a disk of a disk drive. The disk drive comprises control circuitry and a head disk assembly (HDA) comprising the disk, an actuator arm, a head connected to a distal end of the actuator arm, and a voice coil motor for rotating the actuator arm about a pivot to position the head radially over the disk. The disk comprises a plurality of spiral tracks, wherein each spiral track comprises a high frequency signal interrupted at a predetermined interval by a sync mark. The head internal to the disk drive is used to read the spiral tracks to generate a read signal. The read signal is processed with sync mark detection circuitry to detect the sync marks in the spiral tracks. A time-stamped sync mark detect signal is generated when one of the sync marks is detected, wherein the time-stamped sync mark detect signal represents a time when the sync mark was detected relative to a servo write clock. A difference between the time-stamped sync mark detect signal and an expected time is computed in firmware to generate a coarse timing recovery measurement used to synchronize the servo write clock. The servo write clock and the head internal to the disk drive are used to write the product servo sectors along a substantially circular target path.

In one embodiment, a modulo-N counter is clocked with the servo write clock and the time-stamped sync mark detect signal is generated by reading the modulo-N counter value when one of the sync marks is detected. In one embodiment, the coarse timing recovery measurement is generated by computing a difference between the modulo-N counter value and an expected count value.

In another embodiment, the read signal is processed with fine timing recovery circuitry to generate fine timing recovery information. The fine timing recovery information is processed in firmware to generate a fine timing recovery measurement, and the servo write clock is further synchronized in response to the fine timing recovery measurement.

The present invention may also be regarded as s disk drive comprising a head disk assembly (HDA) comprising a disk, an actuator arm, a head connected to a distal end of the actuator arm, and a voice coil motor for rotating the actuator arm about a pivot to position the head radially over the disk. The disk comprising a plurality of spiral tracks, wherein each spiral track comprises a high frequency signal interrupted at a predetermined interval by a sync mark. The head internal to the disk drive is used to read the spiral tracks to generate a read signal. The read signal is processed with sync mark detection circuitry to detect the sync marks in the spiral tracks. A time-stamped sync mark detect signal is generated when one of the sync marks is detected, wherein the time-stamped sync mark detect signal represents a time when the sync mark was detected relative to a servo write clock. A difference between the time-stamped sync mark detect signal and an expected time is computed in firmware to generate a coarse timing recovery measurement used to synchronize the servo write clock. The servo write clock and the head internal to the disk drive are used to write the product servo sectors along a substantially circular target path.

DESCRIPTION OF THE PREFERRED EMBODIMENTS

Figure 2A:
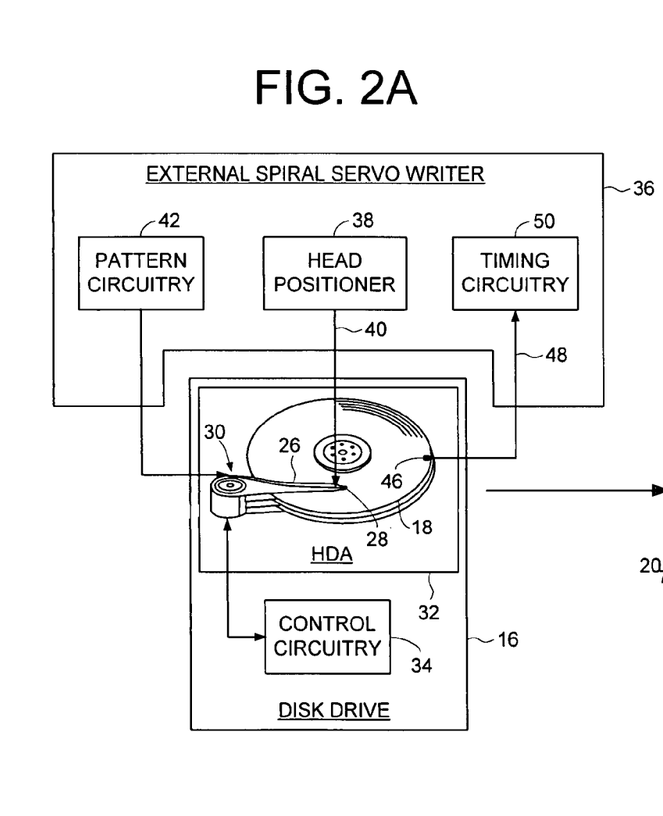
FIGS. 2A and 2B illustrate an embodiment of the present invention wherein an external spiral servo writer is used to write a plurality of spiral tracks to the disk for use in writing product servo sectors to the disk.
Figure 2B:
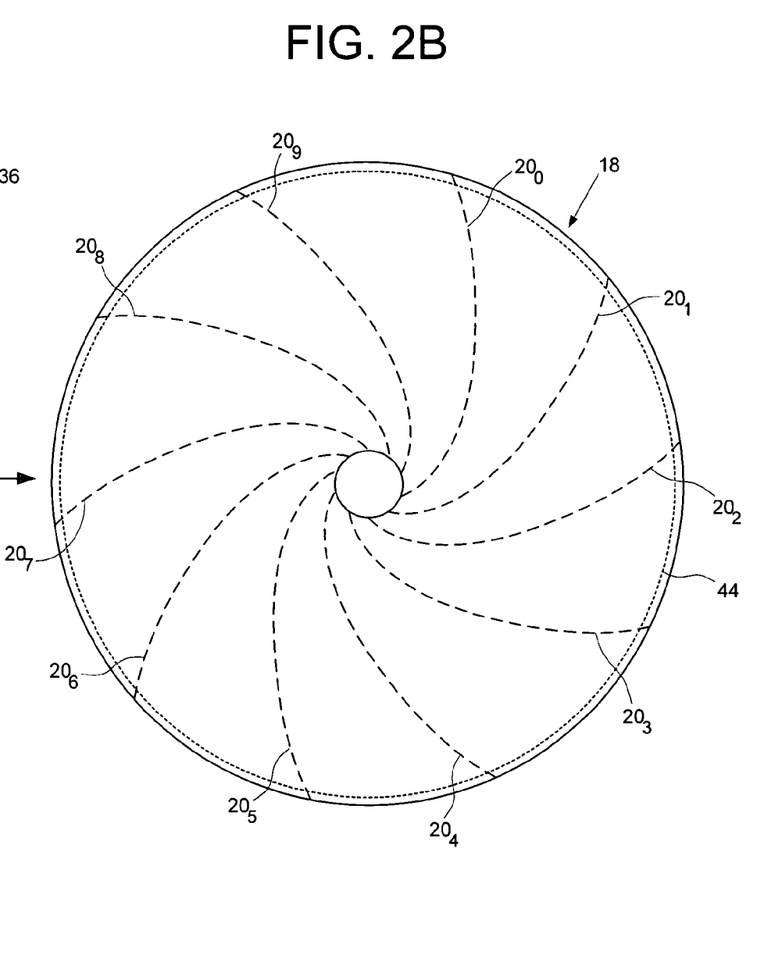
Figure 3A:
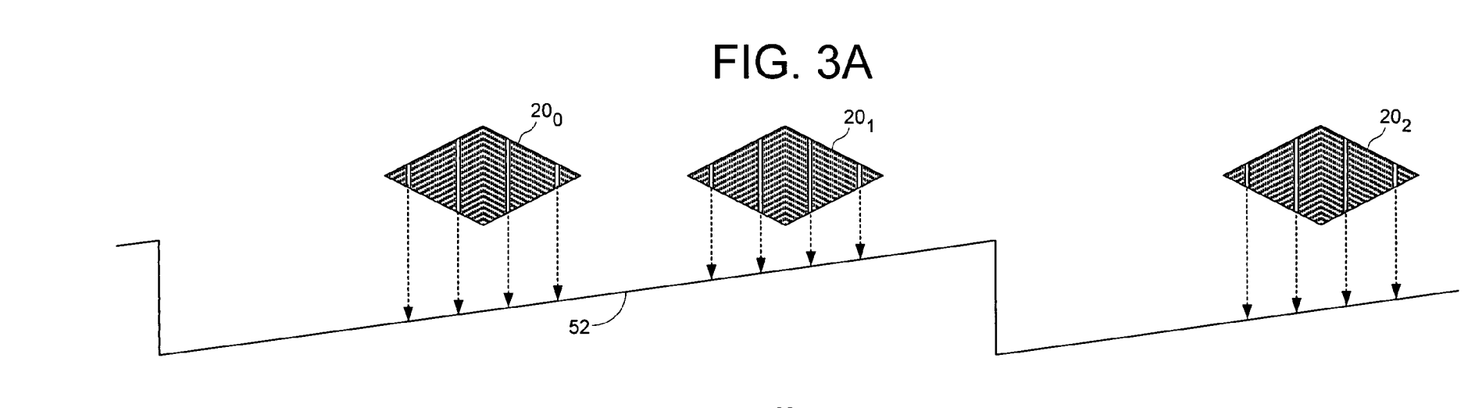
FIG. 3A shows an embodiment of the present invention wherein a servo write clock is synchronized by clocking a modulo-N counter relative to when the sync marks in the spiral tracks are detected.
Figure 3B:
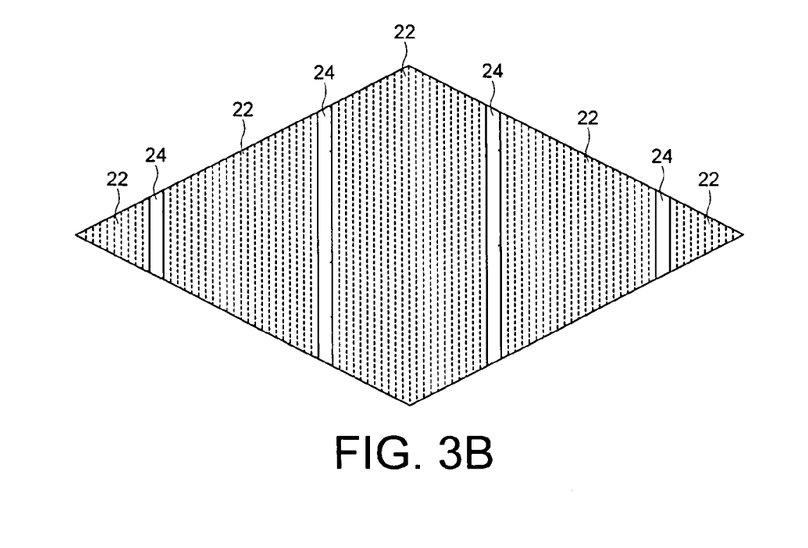
FIG. 3B shows an eye pattern generated by reading the spiral track, including the sync marks in the spiral track.

FIGS. 2A and 2B show a disk drive 16 according to an embodiment of the present invention comprising a disk 18 having a plurality of spiral tracks $20_0$–$20_N$, wherein each spiral track 20 comprises a high frequency signal 22 interrupted at a predetermined interval by a sync mark 24 (FIG. 3B). The disk drive 16 further comprises an actuator arm 26, a head 28 connected to a distal end of the actuator arm 26, and a voice coil motor 30 for rotating the actuator arm 26 about a pivot to position the head 28 radially over the disk 18. The head 28 internal to the disk drive 16 is used to read the spiral tracks $20_0$–$20_N$ to generate a read signal. The read signal is processed with sync mark detection circuitry to detect the sync marks 24 in the spiral tracks $20_0$–$20_N$. A time-stamped sync mark detect signal is generated when one of the sync marks is detected, wherein the time-stamped sync mark detect signal represents a time when the sync mark was detected relative to a servo write clock. A difference between the time-stamped sync mark detect signal and an expected time is computed in firmware to generate a coarse timing recovery measurement used to synchronize the servo write clock. The servo write clock and the head 28 internal to the disk drive are used to write the product servo sectors along a substantially circular target path.

The high frequency signal 22 in the spiral tracks 20 is processed to generate a position error signal (PES) used to maintain the head 28 along the substantially circular target path while writing the product servo sectors to the disk 18. In one embodiment, a fine timing recovery measurement is also generated in response to the high frequency signal 22 and used to further synchronize the servo write clock.

In the embodiment of FIG. 2A, the disk 18, actuator arm 26, head 28 and voice coil motor 30 are enclosed in a head disk assembly (HDA) 32 of the disk drive 16. The disk drive 16 further comprises control circuitry 34 mounted on a printed circuit board for controlling operation of the disk drive 16. In one embodiment, the control circuitry 34 writes the spiral tracks $20_0$–$20_N$ to the disk 18 and then processes the spiral tracks $20_0$–$20_N$ to write the product servo sectors to the disk 18.

In an alternative embodiment shown in FIG. 2A, an external spiral servo writer 36 is used to write the spiral tracks $20_0$–$20_N$ to the disk 16. The external spiral servo writer 36 comprises a head positioner 38 for actuating a head positioning pin 40 using sensitive positioning circuitry, such as a laser interferometer. Pattern circuitry 42 generates the data sequence written to the disk 18 for the spiral tracks $20_0$–$20_N$. The external spiral servo writer 36 writes a clock track 44 (FIG. 2B) at an outer diameter of the disk 18, and a clock head 46 is inserted into the HDA 32 for reading the clock track 44 to generate a clock signal 48. Timing circuitry 50 in the external spiral servo writer 36 processes the clock signal 48 to enable the pattern circuitry 42 at the appropriate time so that the spiral tracks $20_0$–$20_N$ are written at the appropriate circumferential location. The clock signal 48 also enables the pattern circuitry 42 to write the sync marks 24 (FIG. 3B) within the spiral tracks $20_0$–$20_N$ at the same circumferential location from the outer diameter to the inner diameter of the disk 18. As described below with reference to FIG. 4, the constant interval between sync marks 24 (independent of the radial location of the head 28) enables the servo write clock to maintain synchronization.

In the embodiment of FIG. 2A, the entire disk drive 16 is shown as being inserted into the external spiral servo writer 36. In an alternative embodiment, only the HDA 32 is inserted into the external spiral servo writer 36.

After the external spiral servo writer 36 writes the spiral tracks $20_0$–$20_N$ to the disk 18, the head positioning pin 40 and clock head 46 are removed from the HDA 32 and the product servo sectors are written to the disk 18. In one embodiment, the control circuitry 34 within the disk drive 16 is used to process the spiral tracks $20_0$–$20_N$ in order to write the product servo sectors to the disk 18. In an alternative embodiment described below with reference to FIGS. 11 and 12, an external product servo writer is used to process the spiral tracks $20_0$–$20_N$ in order to write the product servo sectors to the disk 18 during a "fill operation".

FIG. 3B illustrates an "eye" pattern in the read signal that is generated when the head 28 passes over a spiral track 20. The read signal representing the spiral track comprises high frequency transitions 22 interrupted by sync marks 24. When the head 28 moves in the radial direction, the eye pattern will shift (left or right) while the sync marks 24 remain fixed. The shift in the eye pattern (detected from the high frequency signal 22) relative to the sync marks 24 provides the off-track information for servoing the head 28.

FIG. 3A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$–$20_N$ are detected at a target modulo-N count value. The servo write clock may be generated using any suitable circuitry. In one embodiment, the servo write clock is generated using a phase locked loop (PLL). As each sync mark 24 in the spiral tracks $20_0$–$20_N$ is detected, the value of the modulo-N counter represents the phase error for adjusting the PLL. In one embodiment, the PLL is updated when any one of the sync marks 24 within the eye pattern is detected. In this manner the multiple sync marks 24 in each eye pattern (each spiral track crossing) provides redundancy so that the PLL is still updated if one or more of the sync marks 24 are missed due to noise in the read signal. Once the sync marks 24 are detected at the target modulo-N count values, the servo write clock is coarsely locked to the desired frequency for writing the product servo sectors to the disk 18.

The sync marks 24 in the spiral tracks $20_0$–$20_N$ may comprise any suitable pattern, and in one embodiment, a pattern that is substantially shorter than the sync mark 10 in the conventional product servo sectors 2 of FIG. 1. A shorter sync mark 24 allows the spiral tracks $20_0$–$20_N$ to be written to the disk 18 using a steeper slope (by moving the head faster from the outer diameter to the inner diameter of the disk 18) which reduces the time required to write each spiral track $20_0$–$20_N$.

In one embodiment, the servo write clock is further synchronized by generating a timing recovery measurement from the high frequency signal 22 between the sync marks 24 in the spiral tracks $20_0$–$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 4:
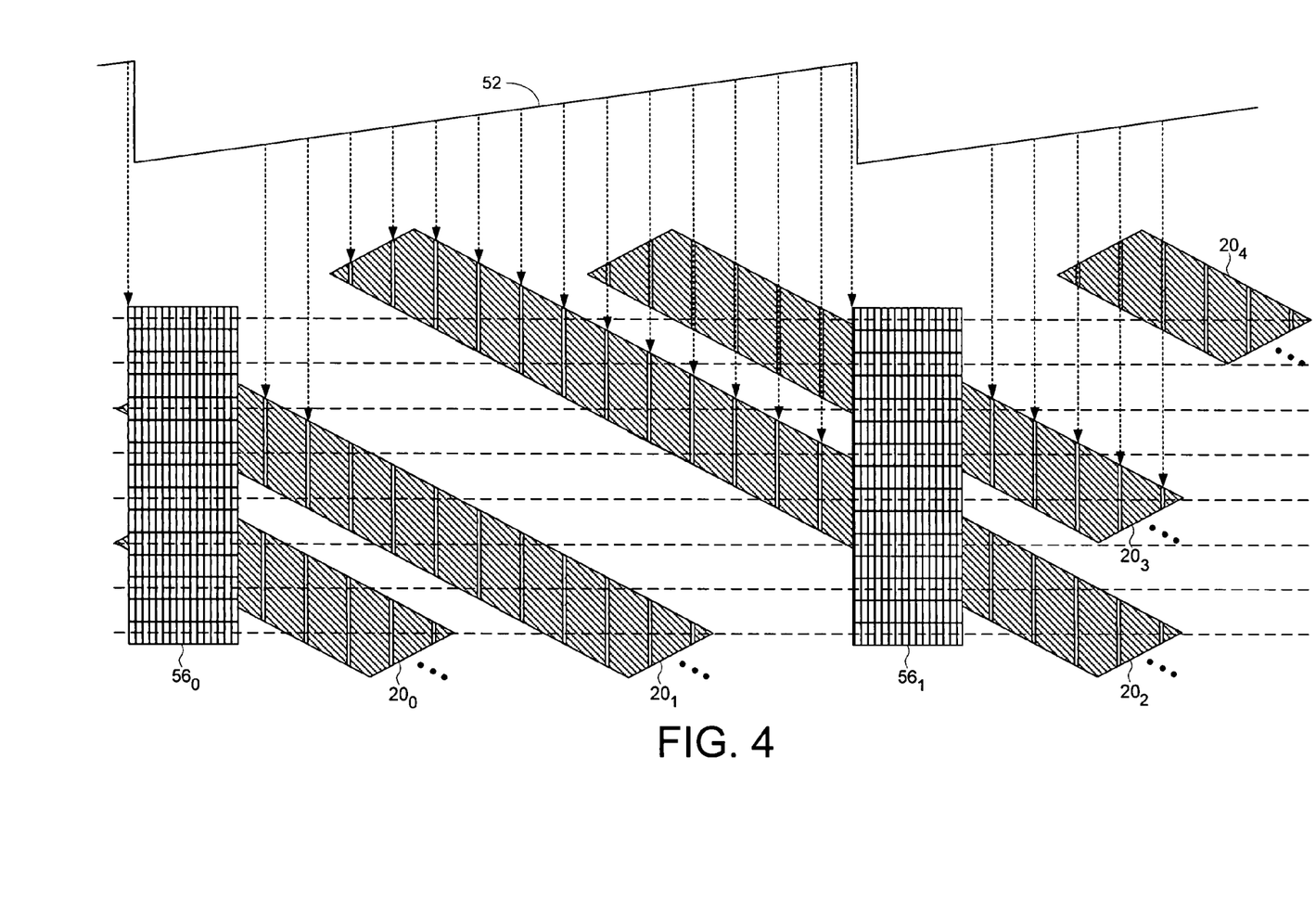
FIG. 4 illustrates an embodiment of the present invention wherein synchronization of the servo write clock is maintained from a coarse timing recovery measurement generated in response to the sync marks recorded in the spiral tracks and a fine timing recovery measurement generated in response to the high frequency signal in the spiral tracks.

FIG. 4 illustrates how the product servo sectors $56_0$–$56_N$ are written to the disk 18 after synchronizing the servo write clock in response to the high frequency signal 22 and the sync marks 24 in the spiral tracks $20_0$–$20_N$. In the embodiment of FIG. 4, the dashed lines represent the centerlines of the data tracks. The sync marks in the spiral tracks $20_0$–$20_N$ are written so that there is a shift of two sync marks in the eye pattern (FIG. 3B) between data tracks. In an alternative embodiment, the sync marks in the spiral tracks $20_0$–$20_N$ are written so that there is a shift of N sync marks in the eye pattern between data tracks. In practice the width of the spiral tracks $20_0$–$20_N$ in the embodiment of FIG. 4 will be proximate the width of a data track. The spiral tracks $20_0$–$20_N$ are shown in FIG. 4 as being wider than the width of a data track for illustration purposes.

The PES for maintaining the head 28 along a servo track (tracking) may be generated from the spiral tracks $20_0$–$20_N$ in any suitable manner. In one embodiment, the PES is generated by detecting the eye pattern in FIG. 3B using an envelope detector and detecting a shift in the envelope relative to the sync marks 24. In one embodiment, the envelope is detected by integrating the high frequency signal 22 and detecting a shift in the resulting ramp signal. In an alternative embodiment, the high frequency signal 22 between the sync marks 24 in the spiral tracks are demodulated as servo bursts and the PES generated by comparing the servo bursts in a similar manner as the servo bursts 14 in the conventional servo sectors (FIG. 1).

Once the head 28 is tracking on a servo track, the product servo sectors $56_0$–$56_N$ are written to the disk using the servo write clock. Write circuitry is enabled when the modulo-N counter reaches a predetermined value, wherein the servo write clock clocks the write circuitry to write the product servo sector 56 to the disk. The spiral tracks $20_0$–$20_N$ on the disk are processed in an interleaved manner to account for the product servo sectors $56_0$–$56_N$ overwriting a spiral track. For example, when writing the product servo sectors 56, to the disk, spiral track 202 is processed initially to generate the PES tracking error and the timing recovery measurement. When the product servo sectors 56, begin to overwrite spiral track 202, spiral track 203 is processed to generate the PES tracking error and the timing recovery measurement.

Figure 5:
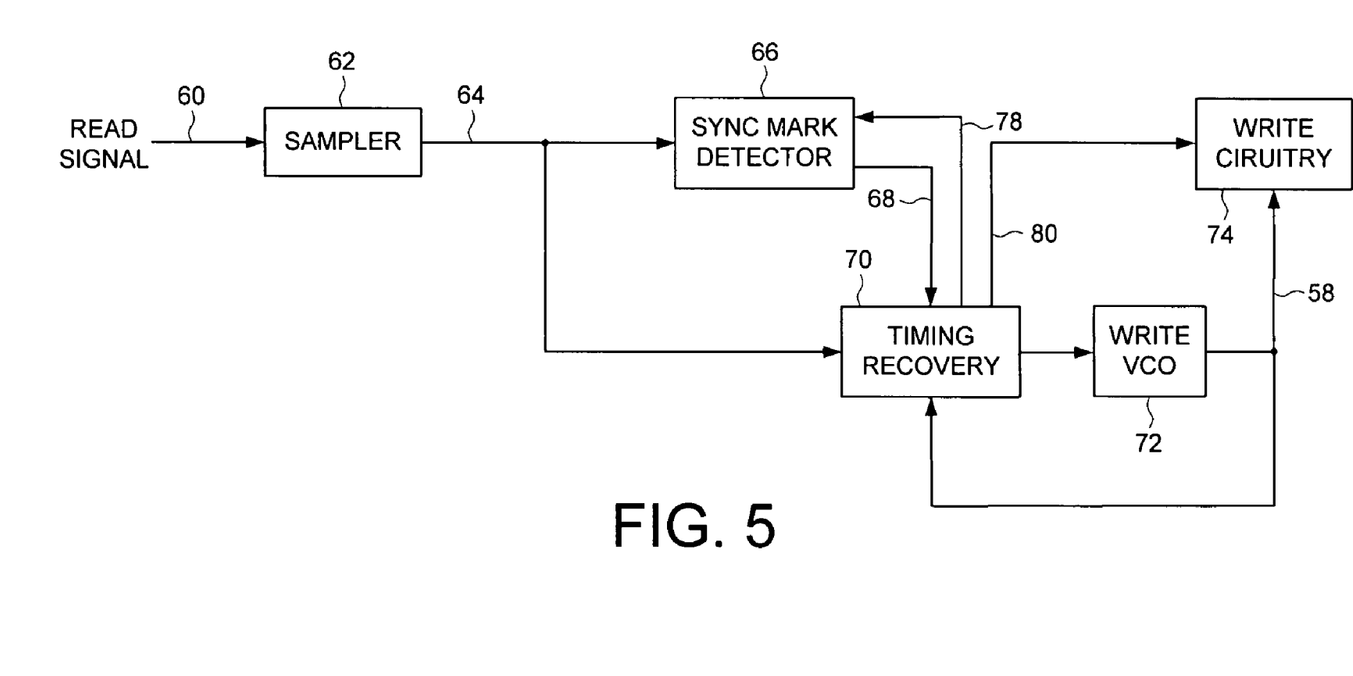
FIG. 5 shows circuitry according to an embodiment of the present invention for generating the servo write clock including a sync detector for detecting the sync marks in the spiral tracks and timing recovery for adjusting the frequency of a write voltage controlled oscillator (VCO).

FIG. 5 shows details of control circuitry for synchronizing the servo write clock 58. The read signal 60 emanating from the head 28 is sampled 62, and the read signal sample values 64 are processed by a sync mark detector 66 for detecting the sync marks 24 in the spiral tracks $20_0$–$20_N$. The sync mark detector 66 generates a sync mark detect signal 68 applied to a timing recovery circuit 70. The timing recovery circuit 70 processes the sync mark detect signal 68 to generate a coarse timing recovery measurement, and the read signal sample values 64 representing the high frequency signal 22 in the spiral tracks $20_0$–$20_N$ to generate a fine timing recovery measurement. The coarse and fine timing recovery measurements are combined to generate a control signal applied to a write voltage controlled oscillator (VCO) 72 which outputs the servo write clock 58. The servo write clock 58 clocks operation of write circuitry 74 for writing the product servo sectors $56_0$–$56_N$ to the disk 18. The servo write clock 58 is also fed back into the timing recovery circuit 70 and used to generate the coarse timing recovery measurement. The timing recovery circuit 70 generates a sync mark detection window over line 78 for enabling the sync mark detector 66 during a window where a sync mark 24 is expected to occur. The timing recovery circuit 70 also generates a control signal over line 80 to enable the write circuitry 74 to begin writing a product servo sector at the appropriate time.

Figure 6:
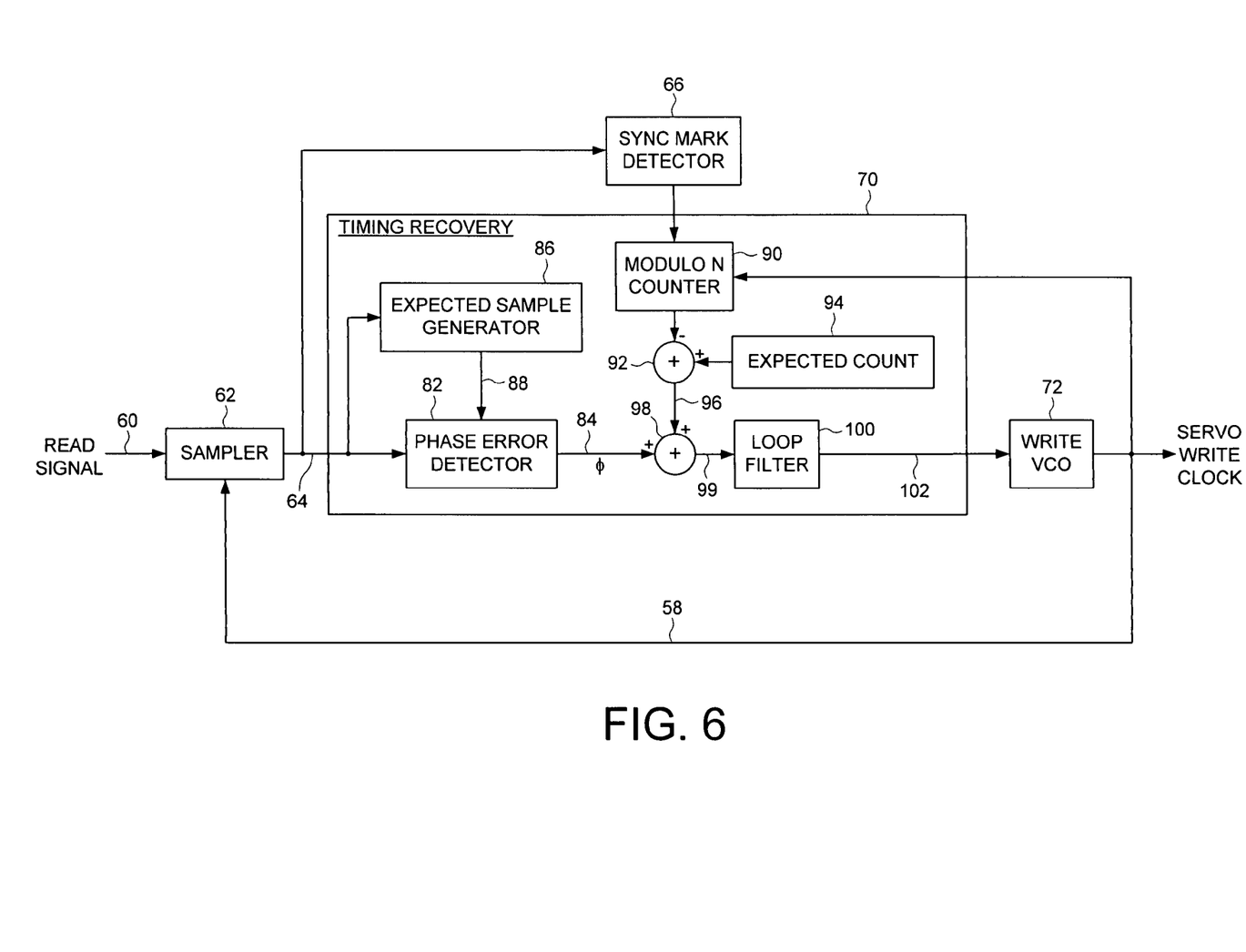
FIG. 6 shows an embodiment of the timing recovery circuitry wherein a phase error is generated from read signal sample values and expected sample values, and the servo write clock is used to synchronously sample the read signal.
Figure 7:
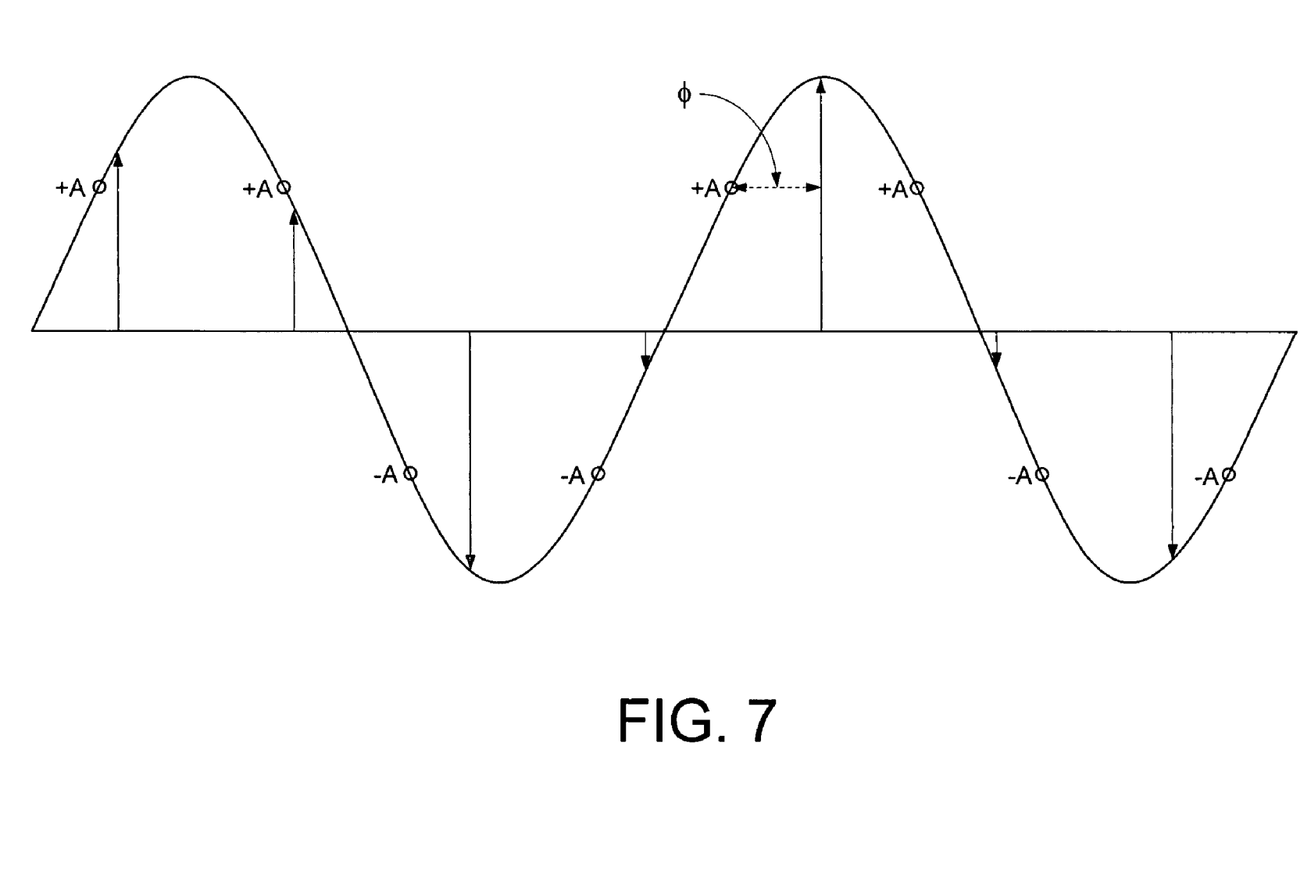
FIG. 7 illustrates the read signal sample values, the expected sample values, and the corresponding phase error.

FIG. 6 shows details of a suitable timing recovery circuit 70 according to an embodiment of the present invention wherein the servo write clock 58 is used to synchronously sample 62 the read signal 60 to generate synchronous read signal sample values 64. A phase error detector 82 detects a phase error φ 84 between the read signal sample values 64 (arrows in FIG. 7) and expected sample values 88 (circles in FIG. 7). An expected sample generator 86 generates the expected sample values 88 input into the phase error detector 82. The phase error detector 82 generates the phase error φ 84 by implementing a suitable stochastic gradient equation. In one embodiment, the expected sample generator 86 processes the read signal samples 64 to initialize a state machine which then outputs the expected sample values 88. Referring to FIG. 7, after being initialized the state machine generates the sequence ( . . . +A,+A,−A,−A,+A,+A,−A,−A . . . ). In one embodiment, a high bandwidth gain loop maintains the gain of the read signal sample values 64 at a target level to compensate for the amplitude variation in the read signal 60 (the eye pattern of FIG. 3B) as the head 28 passes over a spiral track 20. In an alternative embodiment, the amplitude A of the expected sample values 88 is adjusted relative to the amplitude of the read signal 60. For example, an envelope detector can track the amplitude of the eye pattern (FIG. 3B) and then adjust the amplitude A of the expected sample values 88 accordingly.

The servo write clock 58 also clocks a modulo-N counter 90. When the sync mark detector 66 detects a sync mark 24 in a spiral track 20, the content of the modulo-N counter 90 is subtracted 92 from an expected count value 94 to generate the coarse timing recovery measurement 96. The coarse timing recovery measurement 96 and the fine timing recovery measurement (phase error φ 84) are combined 98 to generate a composite timing recovery measurement 99. The composite timing recovery measurement 99 is filtered by a loop filter 100, the output of which is a frequency control signal 102 applied to the write VCO 72 in order to synchronize the servo write clock 58.

Any suitable technique may be used to generate the fine timing recovery measurement (phase error φ from the high frequency signal 22 in the spiral tracks 20. In one embodiment, a suitable trigonometric identity is employed to generate the phase error φ in a manner that is substantially independent of the amplitude variations in the read signal 60.

Figure 8:
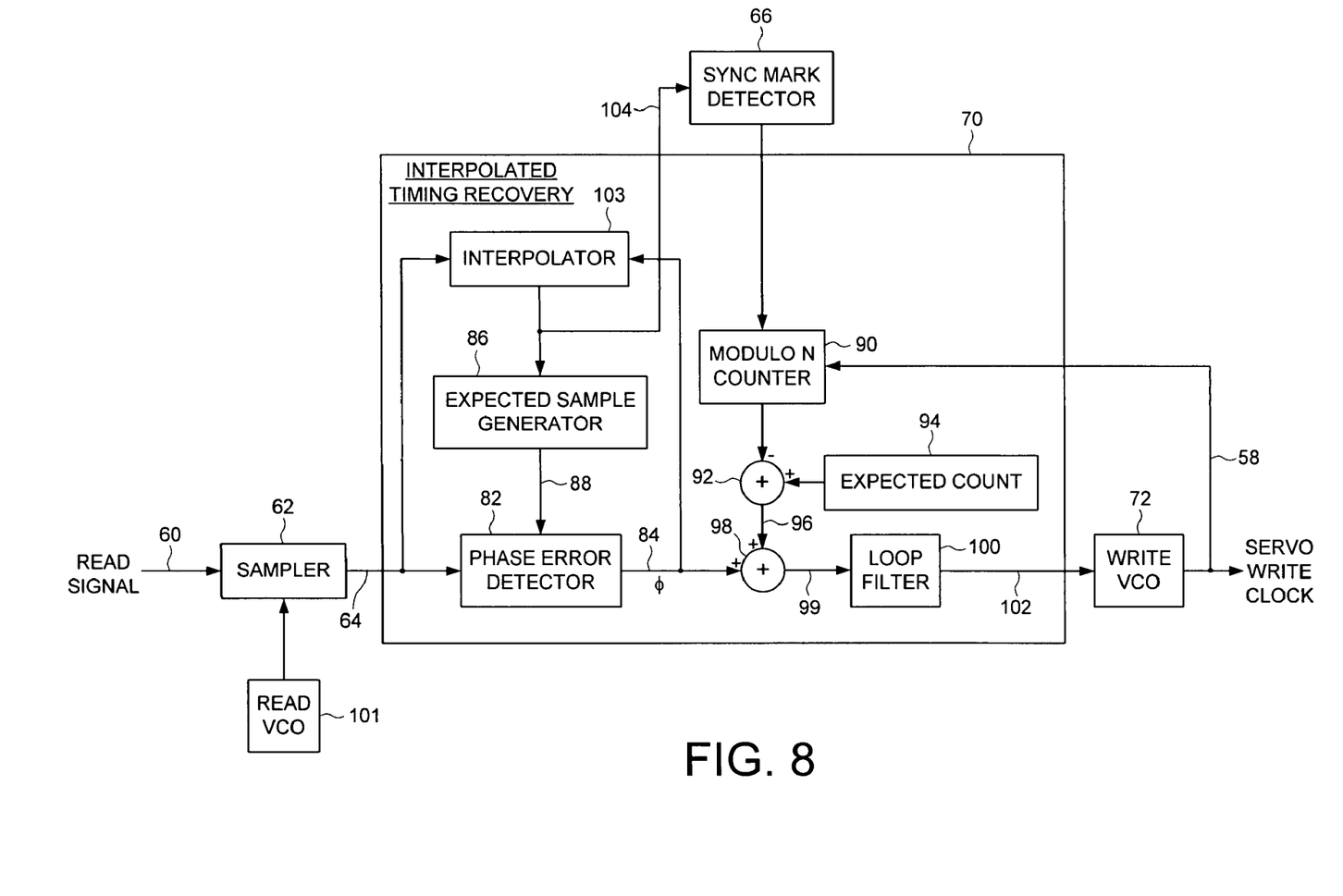
FIG. 8 shows an alternative embodiment wherein the timing recovery circuitry comprises an interpolator and a read VCO is used to sample the read signal.

FIG. 8 shows details of a timing recovery circuit 70 according to an alternative embodiment of the present invention employing interpolated timing recovery (ITR). A read VCO 101 samples 62 the reads signal 60 at a constant frequency to generate asynchronous sample values 64. A phase error detector 82 generates a phase error φ 84 between the expected sample values 88 and the asynchronous sample values 64. An interpolator 103 interpolates the asynchronous sample values 64 using the phase error φ84 to generate synchronous sample values 104 processed by the sync mark detector 66 and the expected sample value generator 86. The interpolator 103 may employ any suitable circuitry, and in one embodiment implements a finite impulse response filter with variable coefficients for performing the interpolation. The remaining components in the timing recovery circuit 70 of FIG. 8 operate as described above with reference to FIG. 6 to generate a frequency control signal 102 applied to the write VCO 72 in order to synchronize the servo write clock 58. In one embodiment the read VCO 101 and the write VCO 72 are implemented on the same substrate so that they exhibit substantially the same center frequency and temperature drift.

Figure 9:
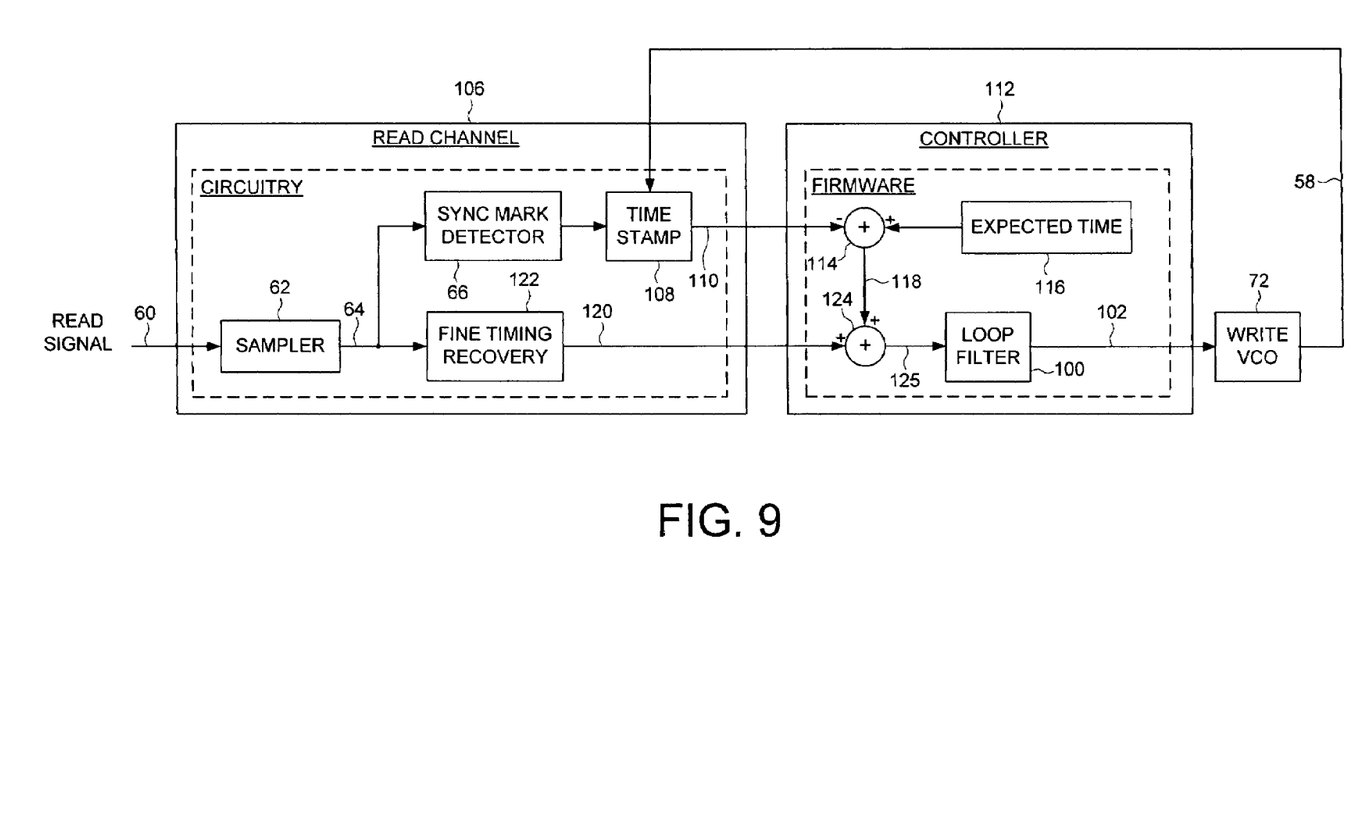
FIG. 9 shows an embodiment of the present invention wherein the sync mark detector is implemented in a read channel integrated circuit and a time-stamped sync mark detect signal is transmitted to a controller for processing in firmware to generate the coarse timing recovery measurement.

FIG. 9 shows an embodiment of the present invention wherein a read channel integrated circuit 106 comprises circuitry for implementing the sync mark detector 66 and time-stamp circuitry 108 for generating a time-stamped sync mark detect signal 110, wherein the time-stamped sync mark detect signal 110 represents a time when a sync mark in a spiral track was detected relative to the servo write clock 58. In the embodiment shown in FIG. 6, the time-stamp circuitry 110 comprises the modulo-N counter 90 wherein the time-stamp sync mark detect signal 110 is the value of the modulo-N counter 90 when a sync mark is detected. The time-stamped sync mark detect signal 110 is processed in firmware executed by a controller 112. The firmware computes a difference 114 between the time-stamped sync mark detect signal 110 and an expected time 116 to thereby generate a coarse timing recovery measurement 118 used to synchronize the servo write clock 58. In the embodiment of FIG. 6, the expected time 116 comprises a table of expected module-N count values corresponding to the expected values of the modulo-N counter 90 at each sync mark.

The controller 112 also receives fine timing recovery information 120 generated by fine timing recovery circuitry 122 within the read channel 106. In the embodiment of FIG. 6, the fine timing recovery information 122 comprises the phase error φ between the read signal sample values 64 (arrows in FIG. 7) and expected sample values 88 (circles in FIG. 7). The phase error φ received by the controller 112 is combined 124 with the coarse timing recovery measurement 118 to generate a composite timing recovery measurement 125 filtered by loop filter 100 implemented in firmware.

Computing the coarse timing recovery measurement 118 in firmware increases the flexibility of the timing recovery algorithm while decreasing the cost and complexity of the circuitry employed in the read channel 106. In addition, implementing the loop filter 100 in firmware allows for more sophisticated (e.g., non-linear) operations to account for anomalies in the coarse timing recovery measurement 118 (such as large transients due to media defects). Yet further advantages realized by implementing timing recovery in firmware include computing (at least partially) the fine timing recovery measurement in firmware, and processing a sync mark reliability metric in firmware.

Figure 10:
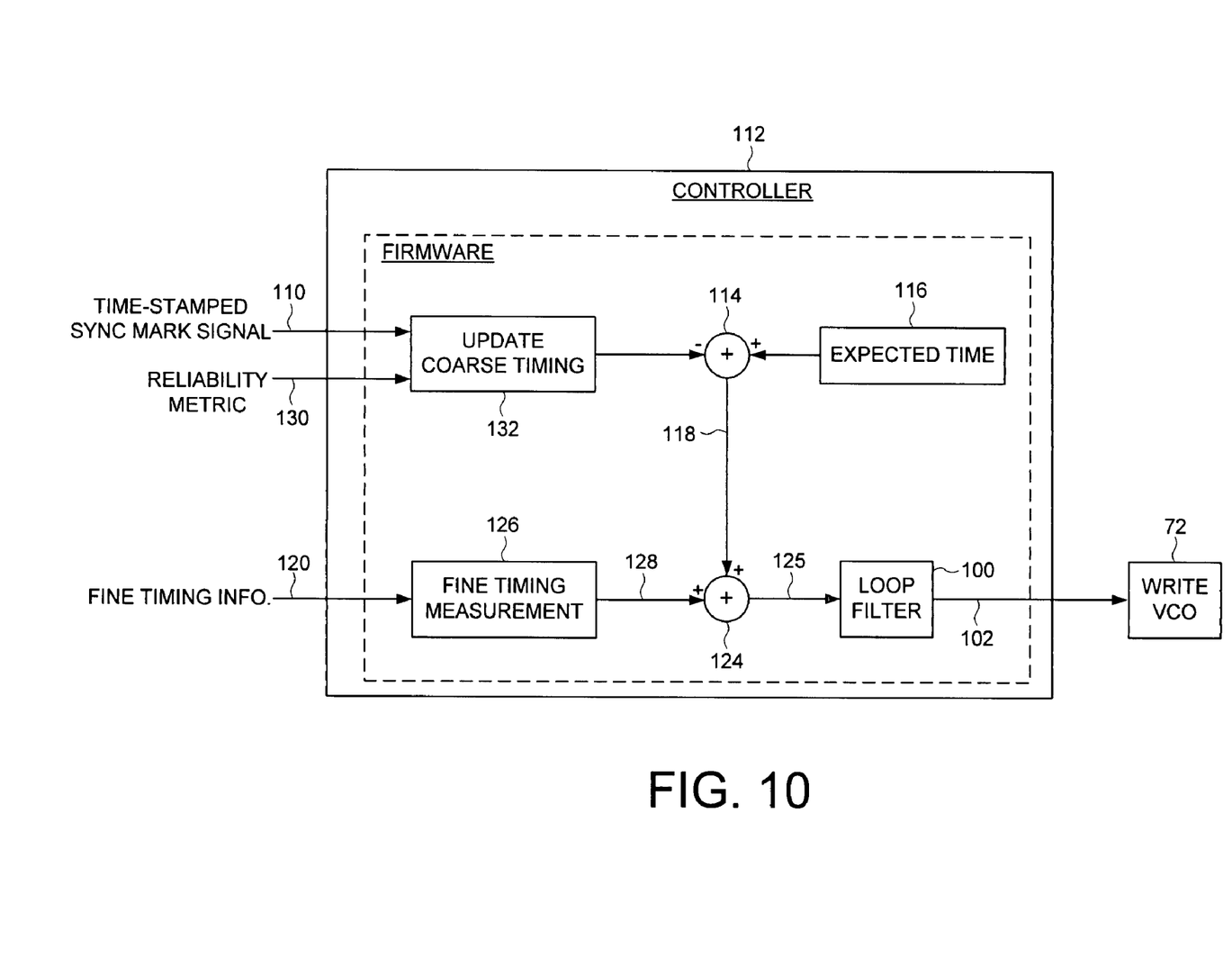
FIG. 10 shows an embodiment of the present invention wherein the controller comprises firmware for generating the fine timing recovery measurement and firmware for evaluating a sync mark reliability metric for updating the coarse timing recovery measurement.

FIG. 10 illustrates an embodiment wherein the controller 112 generates a fine timing recovery measurement in firmware in response to the fine timing recovery information 120 received from the read channel 106. For example, the fine timing recovery information 120 received from the read channel 106 may comprise trigonometric information (e.g., sin and cosine values) processed in firmware (e.g., by computing an arctangent in firmware) to generate the fine timing recovery measurement 128. Implementing complex computations in firmware block 126 (such as an arctangent) reduces the cost and complexity of the read channel 106.

Another benefit illustrated in the embodiment of FIG. 10 is the ability to processes a sync mark reliability metric 130 in firmware for use in generating the coarse timing recovery measurement 118. The sync mark reliability metric 130 provides an indication as to the reliability (i.e., probability of accurate detection) associated with detecting a particular sync mark. If the reliability metric does not exceed a predetermined threshold, the sync mark detect signal 110 is ignored thereby "filtering" bad sync marks from the timing recovery algorithm. This aspect of the timing recovery firmware is shown generally in FIG. 10 as block 132, with more details concerning the use of sync mark reliability metrics disclosed in the above referenced U.S. patent application entitled "SERVO WRITING A DISK DRIVE BY SYNCHRONIZING A SERVO WRITE CLOCK IN RESPONSE TO A SYNC MARK RELIABILITY METRIC".

Figure 11:
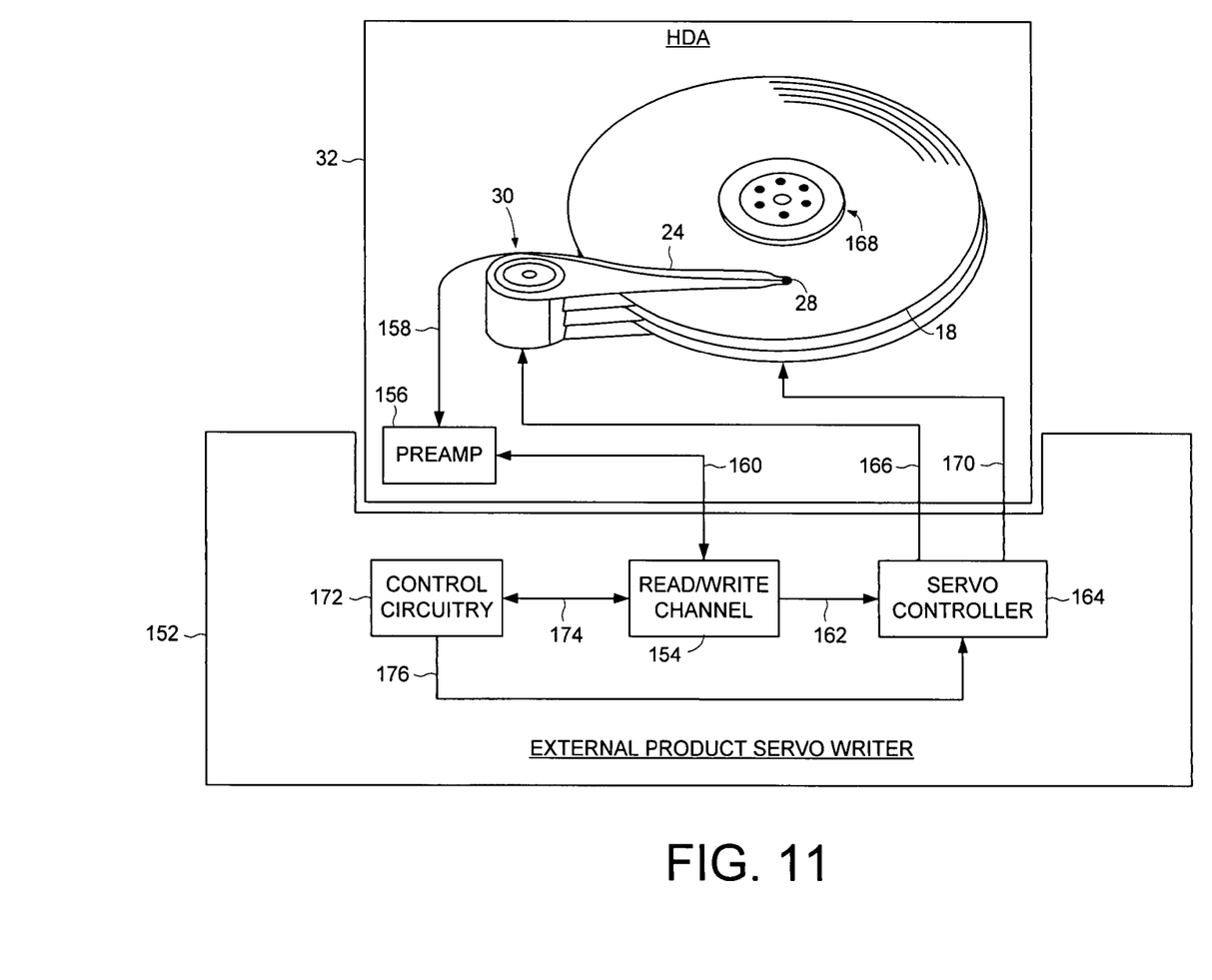
FIG. 11 shows an embodiment of the present invention wherein an external product servo writer is used to process the spiral tracks in order to write the product servo sectors to the disk.
Figure 12:
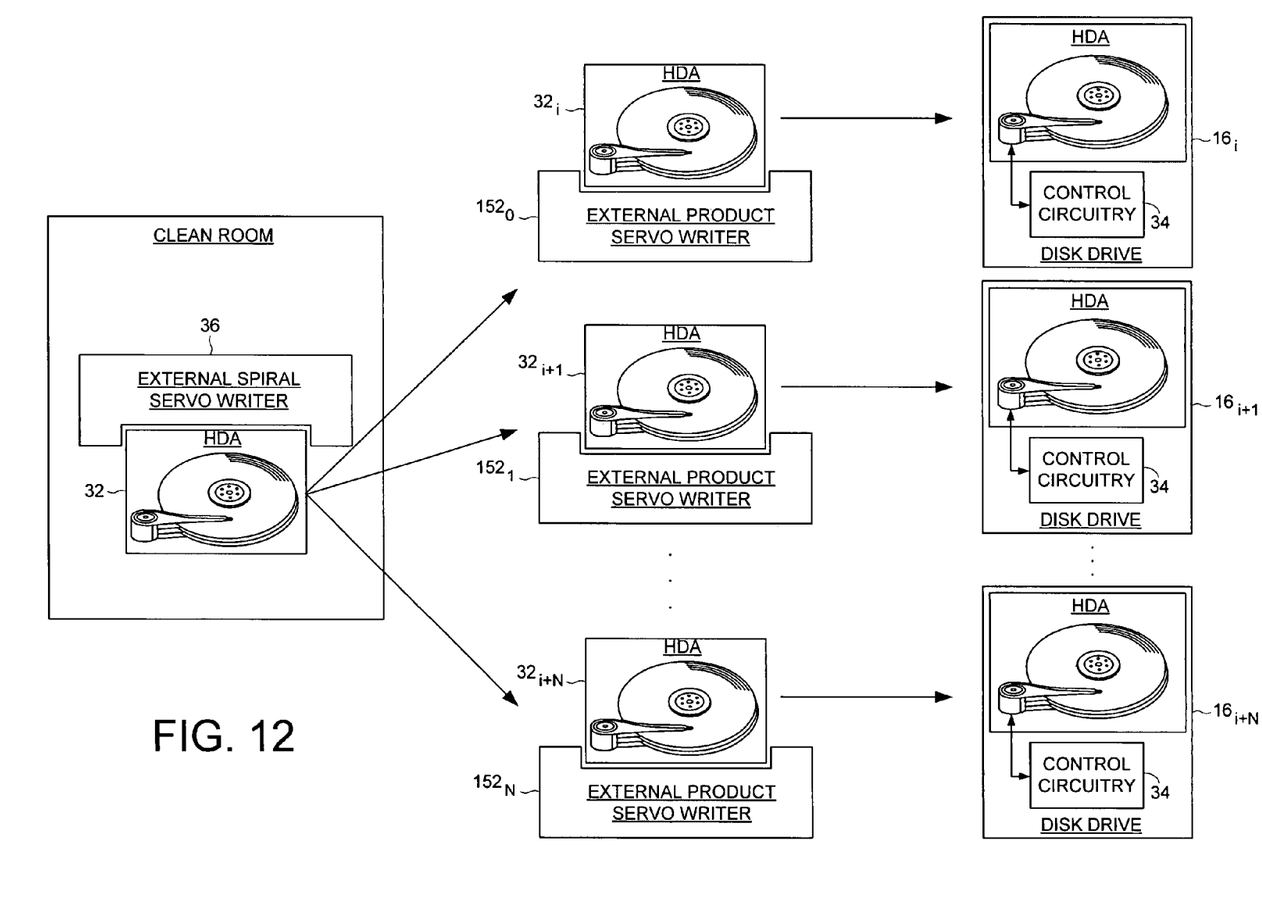
FIG. 12 shows an embodiment of the present invention wherein an external spiral servo writer is used to write the spiral tracks, and a plurality of external product servo writers write the product servo sectors for the HDAs output by the external spiral servo writer.

FIG. 11 shows an embodiment of the present invention wherein after writing the spiral tracks $20_0$–$20_N$ to the disk 18 (FIGS. 2A–2B), the HDA 32 is inserted into an external product servo writer 152 comprising suitable circuitry for reading and processing the spiral tracks $20_0$–$20_N$ in order to write the product servo sectors $56_0$–$56_N$ to the disk 18. The external product servo writer 152 comprises a read/write channel 154 for interfacing with a preamp 156 in the HDA 32. The preamp 156 amplifies a read signal emanating from the head 28 over line 158 to generate an amplified read signal applied to the read/write channel 154 over line 160. The read/write channel 154 comprises circuitry for generating servo burst signals 162 applied to a servo controller 164. The servo controller 164 processes the servo burst signals 162 to generate the PES. The PES is processed to generate a VCM control signal applied to the VCM 30 over line 166 in order to maintain the head 28 along a circular path while writing the product servo sectors $56_0$–$56_N$. The servo controller 164 also generates a spindle motor control signal applied to a spindle motor 168 over line 170 to maintain the disk 18 at a desired angular velocity. Control circuitry 172 processes information received from the read/write channel 154 over line 174 associated with the spiral tracks $20_0$–$20_N$ (e.g., timing information) and provides the product servo sector data to the read/write channel 154 at the appropriate time. The product servo sector data is provided to the preamp 156 which modulates a current in the head 28 in order to write the product servo sectors $56_0$–$56_N$ to the disk 18. The control circuitry 172 also transmits control information over line 176 to the servo controller 164 such as the target servo track to be written. After writing the product servo sectors $56_0$–$56_N$ to the disk 18, the HDA 32 is removed from the external product servo writer 152 and a printed circuit board assembly (PCBA) comprising the control circuitry 34 (FIG. 2A) is mounted to the HDA 32.

Figure 13:
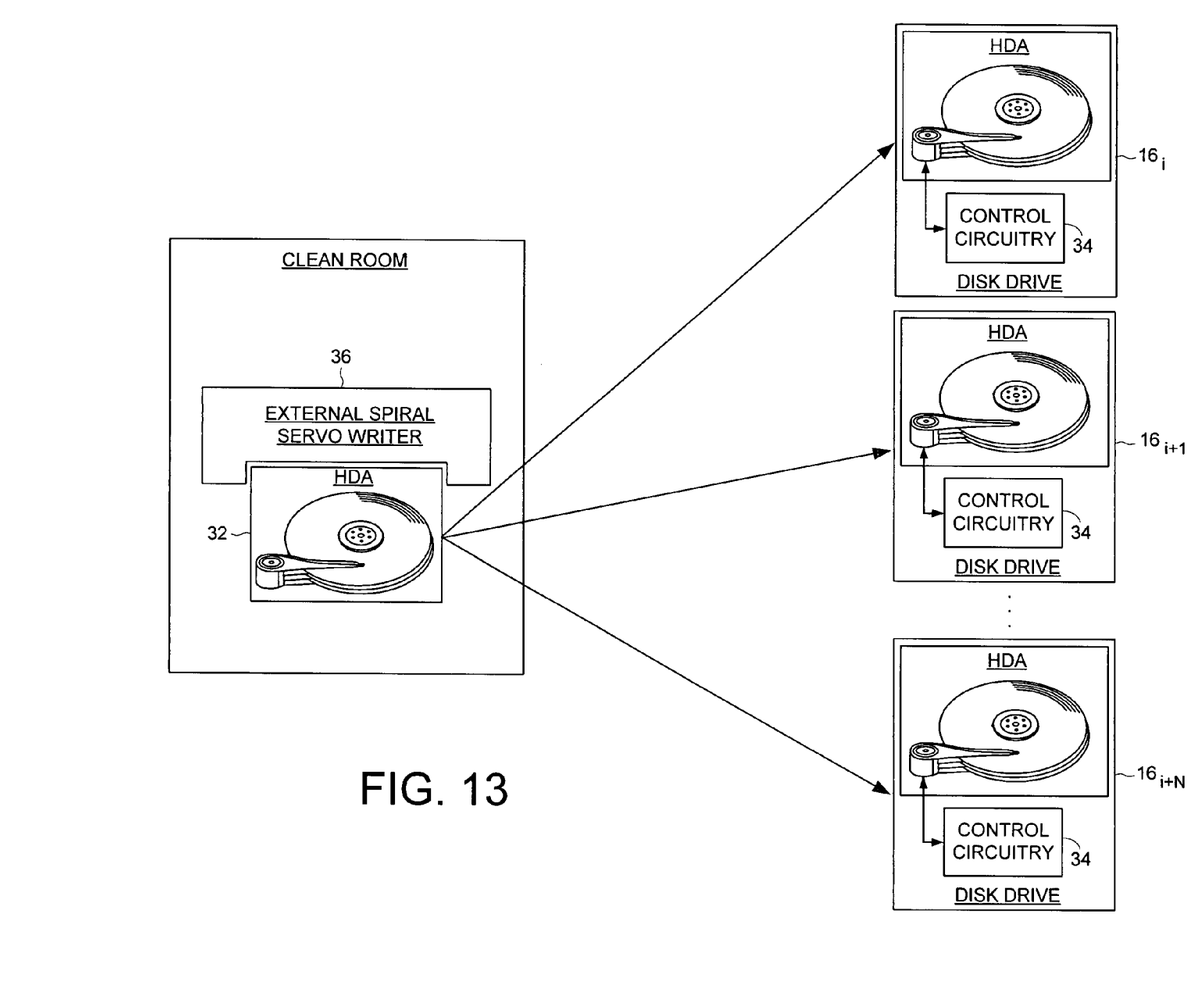
FIG. 13 shows an embodiment of the present invention wherein an external spiral servo writer is used to write the spiral tracks, and the control circuitry within each product disk drive is used to write the product servo sectors.

In one embodiment, the external product servo writer 152 of FIG. 11 interfaces with the HDA 32 over the same connections as the control circuitry 34 to minimize the modifications needed to facilitate the external product servo writer 152. The external product servo writer 152 is less expensive than a conventional servo writer because it does not require a clean room or sophisticated head positioning mechanics. In an embodiment shown in FIG. 12, a plurality of external product servo writers $152_0$–$152_N$ process the HDAs $32_{i-i+N}$ output by an external spiral servo writer 36 in order to write the product servo sectors less expensively and more efficiently than a conventional servo writer. In an alternative embodiment shown in FIG. 13, an external spiral servo writer 36 is used to write the spiral tracks, and the control circuitry 34 within each product disk drive $16_0$–$16_N$ is used to write the product servo sectors.

I claim:

1. A method of writing product servo sectors to a disk of a disk drive, the disk drive comprising control circuitry and a head disk assembly (HDA) comprising the disk, an actuator arm, a head connected to a distal end of the actuator arm, and a voice coil motor for rotating the actuator arm about a pivot to position the head radially over the disk, the disk comprising a plurality of spiral tracks, wherein each spiral track comprises a high frequency signal interrupted at a predetermined interval by a sync mark, the method comprising the steps of:
    (a) using the head internal to the disk drive to read the spiral tracks to generate a read signal;
    (b) processing the read signal with sync mark detection circuitry to detect the sync marks in the spiral tracks;
    (c) generating a time-stamped sync mark detect signal when one of the sync marks is detected, wherein the time-stamped sync mark detect signal represents a time when the sync mark was detected relative to a servo write clock;
    (d) computing in firmware a difference between the time-stamped sync mark detect signal and an expected time to thereby generate a coarse timing recovery measurement used to synchronize the servo write clock; and
    (e) using the servo write clock and the head internal to the disk drive to write the product servo sectors along a substantially circular target path.

2. The method as recited in claim 1, further comprising the step of clocking a modulo-N counter with the servo write clock, wherein the time-stamped sync mark detect signal is generated by reading the modulo-N counter value when one of the sync marks is detected.

3. The method as recited in claim 2, wherein the step of generating the coarse timing recovery measurement comprises the step of computing a difference between the modulo-N counter value and an expected count value.

4. The method as recited in claim 3, further comprising the steps of:
    (a) processing the read signal with fine timing recovery circuitry to generate fine timing recovery information;
    (b) processing the fine timing recovery information with firmware to generate a fine timing recovery measurement; and
    (c) further synchronizing the servo write clock in response to the fine timing recovery measurement.

5. A disk drive comprising a head disk assembly (HDA) comprising a disk, an actuator arm, a head connected to a distal end of the actuator arm, and a voice coil motor for rotating the actuator arm about a pivot to position the head radially over the disk, the disk comprising a plurality of spiral tracks, wherein each spiral track comprises a high frequency signal interrupted at a predetermined interval by a sync mark, the disk drive further comprising control circuitry for writing product servo sectors to the disk by executing the steps of:
    (a) using the head internal to the disk drive to read the spiral tracks to generate a read signal;
    (b) processing the read signal with sync mark detection circuitry to detect the sync marks in the spiral tracks;
    (c) generating a time-stamped sync mark detect signal when one of the sync marks is detected, wherein the time-stamped sync mark detect signal represents a time when the sync mark was detected relative to a servo write clock;
    (d) computing in firmware a difference between the time-stamped sync mark detect signal and an expected time to thereby generate a coarse timing recovery measurement used to synchronize the servo write clock; and
    (e) using the servo write clock and the head internal to the disk drive to write the product servo sectors along a substantially circular target path.

6. The disk drive as recited in claim 5, wherein the control circuitry further executes the step of clocking a modulo-N counter with the servo write clock, and the time-stamped sync mark detect signal is generated by reading the modulo-N counter value when one of the sync marks is detected.

7. The disk drive as recited in claim 6, wherein the step of generating the coarse timing recovery measurement comprises the step of computing a difference between the modulo-N counter value and an expected count value.

8. The disk drive as recited in claim 7, wherein the control circuitry further executes the steps of:

(a) processing the read signal with fine timing recovery circuitry to generate fine timing recovery information;

(b) processing the fine timing recovery information with firmware to generate a fine timing recovery measurement; and (c) further synchronizing the servo write clock in response to the fine timing recovery measurement.

* * * * *